(No Model.) 2 Sheets—Sheet 1.
R. R. REYNOLDS & B. M. KIRKER.
APPARATUS FOR THAWING BLOCKS OF MANUFACTURED ICE FROM MOLDS.
No. 577,175. Patented Feb. 16, 1897.
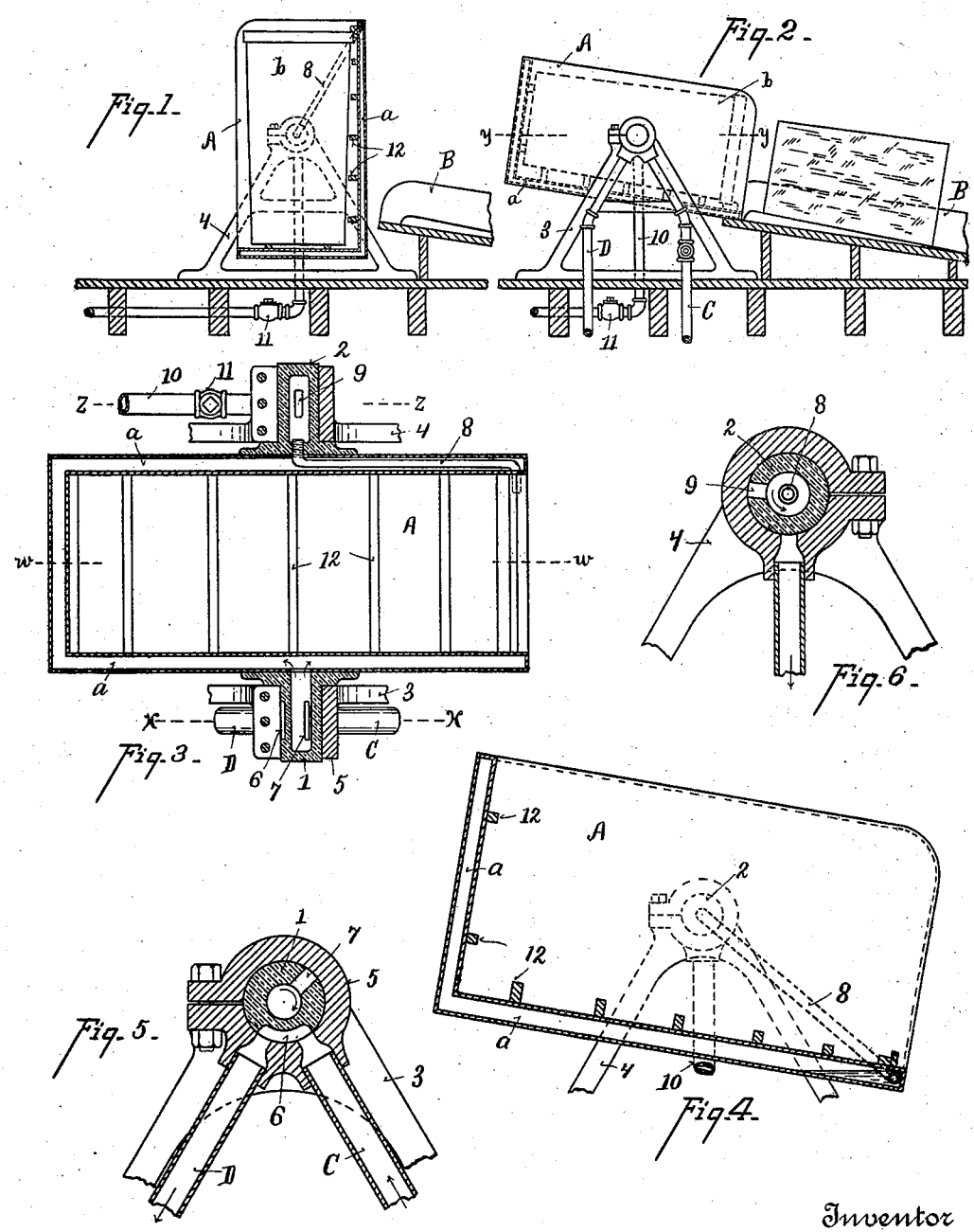
Witnesses
L. F. Parks
H. Strad
Inventor
Robert R. Reynolds & Ben M. Kirker
By C. W. Miles
Attorney (No Model.) 2 Sheets—Sheet 2.
R. R. REYNOLDS & B. M. KIRKER.
APPARATUS FOR THAWING BLOCKS OF MANUFACTURED ICE FROM MOLDS.
No. 577,175. Patented Feb. 16, 1897.
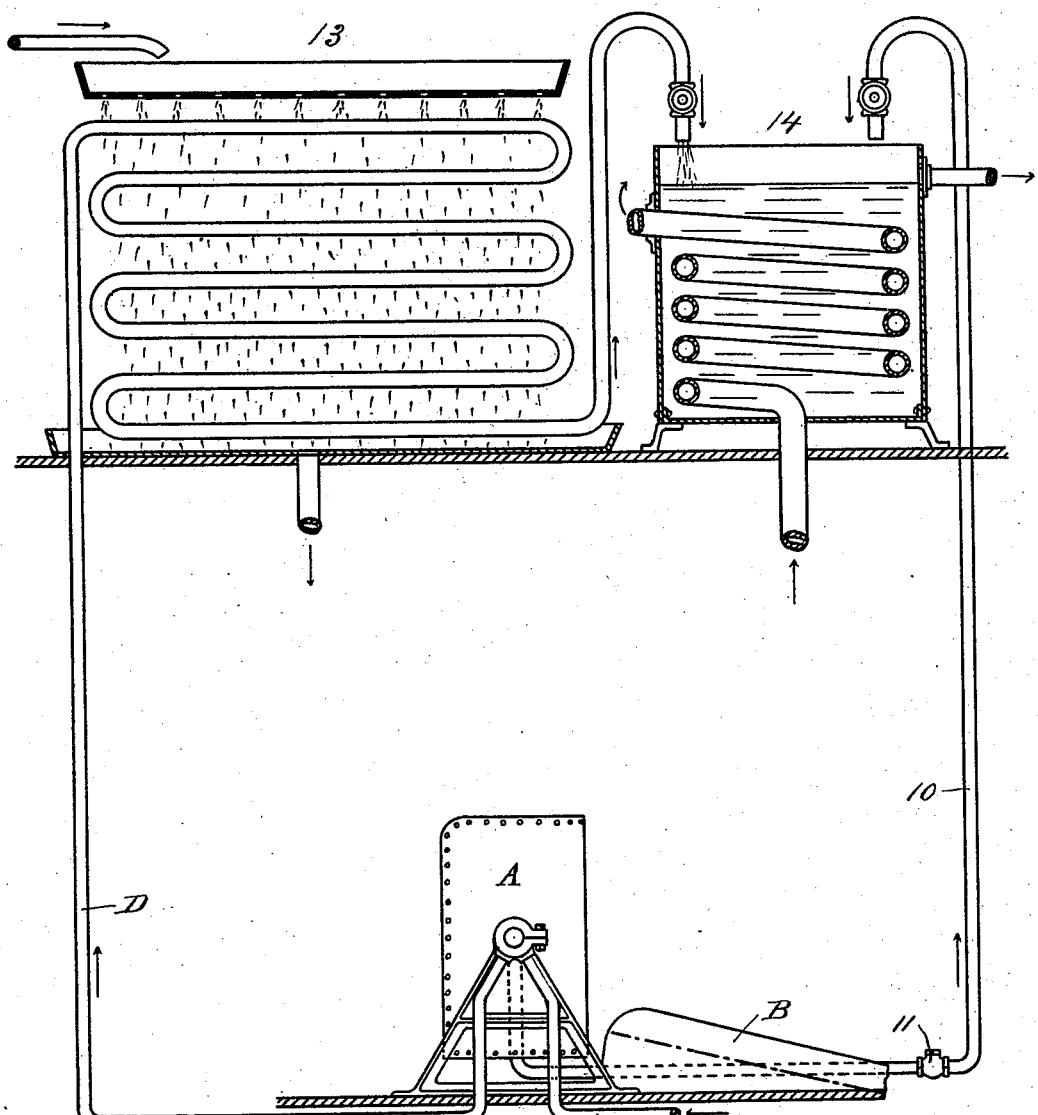

United States Patent Office.

ROBERT R. REYNOLDS AND BEN M. KIRKER, OF CINCINNATI, OHIO.

APPARATUS FOR THAWING BLOCKS OF MANUFACTURED ICE FROM MOLDS.

SPECIFICATION forming part of Letters Patent No. 577,175, dated February 16, 1897.

Application filed October 14, 1895. Serial No. 565,692. (No model.)

*To all whom it may concern:*

Be it known that we, ROBERT R. REYNOLDS and BEN M. KIRKER, residing at Cincinnati, in the county of Hamilton and State of Ohio, have invented certain new and useful Improvements in Apparatus for Thawing Blocks of Manufactured Ice from Their Molds, of which the following is a specification.

Our invention relates to apparatus for thawing blocks of manufactured ice from their molds.

One of the objects of our invention is to provide means for thawing the blocks from the molds and also condensing steam to provide distilled water used in manufacturing the ice.

Another object is to improve and simplify the construction and promote the efficiency of apparatus of the nature referred to.

To these ends our invention consists in the features and in the construction and arrangement hereinafter described, due reference being had to the accompanying drawings, making a part of this specification, in which—

Figure 1 represents a central vertical section of our device in position to receive the mold. Fig. 2 is a side elevation of the same in position to discharge the block of ice. Fig. 3 is an enlarged sectional view on line $y\ y$, Fig. 2. Fig. 4 is a section on line $w\ w$, Fig. 3. Fig. 5 is a detail sectional view of the steam-inlet valve on line $x\ x$, Fig. 3. Fig. 6 is a detail sectional view of the exit-valve on line $z\ z$, Fig. 3. Fig. 7 is a view in elevation, illustrating my improved apparatus in operative connection with a reboiler and condenser of an ice-making plant.

A represents the receptacle, into which the mold $b$ is placed to thaw the ice-block loose therefrom. This receptacle is preferably mounted upon trunnions 1 2, journaled in brackets 3 4, so that it can be tipped over into the position Fig. 2, in which position the ice-block will slip out of the mold as soon as it becomes loose and slide down the chute B into the storage-room.

$a$ represents a steam-jacket formed by constructing the receptacle A with double walls.

C represents the steam-supply pipe, tapping the journal-box 5 of bracket 3.

D represents a steam-pipe, likewise tapping the journal-box 5 and leading therefrom preferably to the condenser 13.

6 represents a port in the face of trunnion 1, which, when the receptacle A is in the upright position, Fig. 1, by-passes the steam from pipe C into pipe D. When, however, the receptacle A is in the horizontal position, the steam from pipe C passes through port 7 and enters the jacket $a$.

The exit of the steam and water of condensation is effected as follows: 8 represents a pipe or passage connecting the hollow trunnion 2 with the lowest point in the steam-jacket $a$. The water of condensation, accumulating at the entrance of this passage 8, is driven by the pressure of the uncondensed steam through this passage into trunnion 2 and thence by port 9 and pipe 10 preferably to the reboiler 14, usually forming part of an artificial-ice-manufacturing system, after which it is ultimately used to refill the ice-molds. By this means all the water of condensation is driven out of the jacket as soon as formed and forced without the use of a pump up to the reboiler, which is usually located at an elevation above that of the thawing device.

As soon as the ice-block leaves the mold the receptacle A, carrying the mold, is turned to an upright position, cutting off the supply of steam to the jacket and passing it on through pipe D to the condenser instead. Port 9 is also closed against the return of water from the reboiler or pipe 10. A check-valve 11 is also preferably employed for this purpose.

12 represents a wooden grating which prevents the ice-mold coming directly in contact with the walls of the receptacle, thus allowing space for the circulation of heated air.

By the use of a steam-heated receptacle for thawing the blocks from their molds we are enabled to utilize these receptacles as condensers. The molds are evenly and quickly heated, and we avoid all the vapors and dampness incident to the use of water as heretofore employed.

Having described our invention, what we claim is—

1. In a device for thawing ice from molds, the combination of a tilting receptacle for the mold having a hollow steam-space formed in its inclosing walls, a steam-supply pipe, an exit-pipe leading to a reboiler and communicating with the lowermost portion of the steam-space when the receptacle is tilted into position to discharge the ice, whereby the water of condensation is blown off to the reboiler, a check-valve arranged in the exit-pipe for preventing back pressure from the reboiler, and means operating when the receptacle is turned to an upright position to shut off the supply of steam, substantially as described.

2. In a device for thawing ice from molds, the combination of a tilting receptacle for the mold having a hollow steam-space formed in its inclosing walls, a steam-supply pipe, an exit-pipe leading to a reboiler arranged at a higher lever than the mold-receptacle and communicating with the lowermost portion of the steam-space when the receptacle is tilted into position to discharge the ice, whereby the water of condensation is elevated to the reboiler, and means operating when the receptacle is turned to an upright position to shut off the supply of steam and close the exit-pipe, substantially as described.

3. In a device for thawing ice from molds, the combination with the supporting-brackets 3 4, of the receptacle A having a hollow steam-space formed in its inclosing walls, and mounted on hollow trunnions 1 2 journaled in said brackets, a steam-supply pipe C adapted to alternately communicate with ports 6 and 7 in the hollow trunnion 1, a steam-pipe D communicating with the port 6 and leading to a condenser, an exit-pipe communicating with the steam-space of the receptacle and with the trunnion 2, and a pipe leading from said trunnion to a reboiler, the construction being such that when the receptacle is turned to an inclined position steam is admitted to the steam-space and the water of condensation is conveyed to the reboiler, but when said receptacle is turned to an upright position the exit-pipe is closed and the live steam conveyed directly to the condenser, substantially as described.

In testimony whereof we have hereunto set our hands.

ROBERT R. REYNOLDS.
BEN M. KIRKER.

Witnesses:
OLIVER B. T. KAISER,
C. W. MILES.